(12) United States Patent
Li (10) Patent No.: US 8,070,500 B2
(45) Date of Patent: Dec. 6, 2011

(54) MOBILE COMMUNICATIONS DEVICE

(75) Inventor: Xiong Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 282 days.

(21) Appl. No.: 12/604,344

(22) Filed: Oct. 22, 2009

(65) Prior Publication Data

US 2011/0070929 A1    Mar. 24, 2011

(30) Foreign Application Priority Data

Sep. 18, 2009 (CN) .......................... 2009 1 0307331

(51) Int. Cl.
*H01R 13/62* (2006.01)
(52) U.S. Cl. ..................................... 439/159; 455/575.1
(58) Field of Classification Search ............... 455/575.1, 455/550.1; 439/159, 457
See application file for complete search history.

(56) References Cited

U.S. PATENT DOCUMENTS

| | | | | |
|---|---|---|---|---|
| 6,109,941 A * | 8/2000 | Koseki et al. | ................. | 439/159 |
| 6,123,560 A * | 9/2000 | Hara et al. | .................... | 439/159 |
| 6,652,301 B2 * | 11/2003 | Harasawa et al. | ............ | 439/159 |
| 6,796,816 B2 * | 9/2004 | He | ............................... | 439/159 |
| 6,857,886 B2 * | 2/2005 | Lai et al. | ....................... | 439/159 |
| 7,192,292 B1 * | 3/2007 | Su | .................................. | 439/159 |
| 7,927,116 B2 * | 4/2011 | Kestur Nagarajan et al. | | 439/159 |

* cited by examiner

*Primary Examiner* — Nay A Maung
*Assistant Examiner* — Angelica Perez
(74) *Attorney, Agent, or Firm* — Altis Law Group, Inc.

(57) ABSTRACT

A mobile communications device comprising: a back cover, which comprises an inner surface and a sidewall. A hatch is formed in the sidewall. An ejection device is fixed to the inner surface of the back cover, and which comprises a resilient wall protruding from the surface of the ejection device, and an electromagnet. A groove member is slidably connected to the ejection device, and is aligned with the hatch, and is configured for putting SIM card. The groove member further defines a hole. A hook device is rotatably connected to the ejection device, and is positioned on the electromagnet, and which comprises a hook portion. A first elastic device is fixed to the groove member, and is configured for pushing the groove to move. A torsion spring is fixed to the ejection device, and is configured for driving the hook device to return to the first position.

9 Claims, 7 Drawing Sheets

MOBILE COMMUNICATIONS DEVICE

BACKGROUND

1. Technical Field

The present disclosure relates to a mobile communications device.

2. Description of Related Art

Generally, the mobile communications device such as a mobile phone, includes a groove for putting in a subscriber identity module (SIM) card.

When removing or inserting the SIM card, users must slide out a back cover of the mobile communications device to make the groove exposed, so as to remove or insert the SIM card. However, a long slide makes a touching surface between the mobile communications device and the back cover smooth, as a result, the back cover cane easily get disengaged from the mobile communications device, and the groove is easily exposed to the mobile communications device.

Therefore, what is need is a mobile communications device which can automatically eject the groove for putting the SIM card.

DETAILED DESCRIPTION

Figure 1:
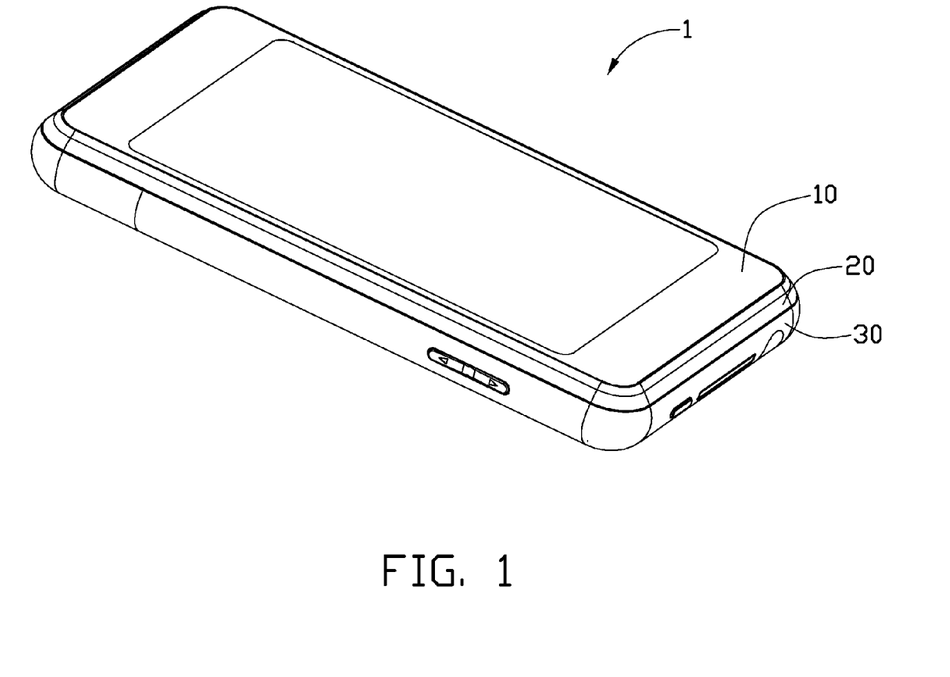
FIG. 1 is an isometric view of a mobile communications device in accordance with an exemplary embodiment.

Referring to FIG. 1, a mobile communications device 1 is disclosed. The mobile communications device 1 includes a front cover 10, a main body 20, and a back cover 30. In the exemplary embodiment, the front cover 10, the main body 20, and the back cover 30 are rectangular, and can be connected by splicing.

Referring to FIGS. 2-5, the back cover 30 includes an inner surface 31 and a sidewall 32. A first through hole 321 and a hatch 322 are formed in the sidewall 32.

The mobile communications device 1 further includes an ejection device 40, a groove member 90, a hook device 50, a first elastic device 60, and a torsion spring 70. The ejection device 40 is fixed to the inner surface 31 of the back cover 30. The ejection device 40 includes a resilient wall 410, a first groove 423 and an electromagnet 43. The elastic wall 410 protrudes from the surface of the ejection device 50. The first groove 423 is formed on the surface of the ejection device 40. The electromagnet 43 is fixed on the top surface of the first groove 423. The groove member 90 is slidably connected to the ejection device 40, and is aligned with the hatch 322. The groove member 90 is configured for receiving the subscriber identity module (SIM) card 100, and defines a hole 917. The hook device 50 is rotatably connected to the ejection device 40 and is positioned on the electromagnet 43. The hook device 50 includes a hook portion 52. One end of the first elasticity device 60 is fixed to the groove member 90. When the hook device 50 keeps in a first position, the hook portion 52 is engaged with the hole 917 of the groove member 90, so that, the first elastic device 60 is compressed by the groove member 90, and generates an elastic force relative to the groove member 90. The first elastic device 60 is configured for pushing the groove member 90 to move. The torsion spring 70 is fixed to the ejection device 40, and is configured for driving the hook device 50 to return to the first position. The torsion spring 70 includes a spring pole 71.

Figure 6:
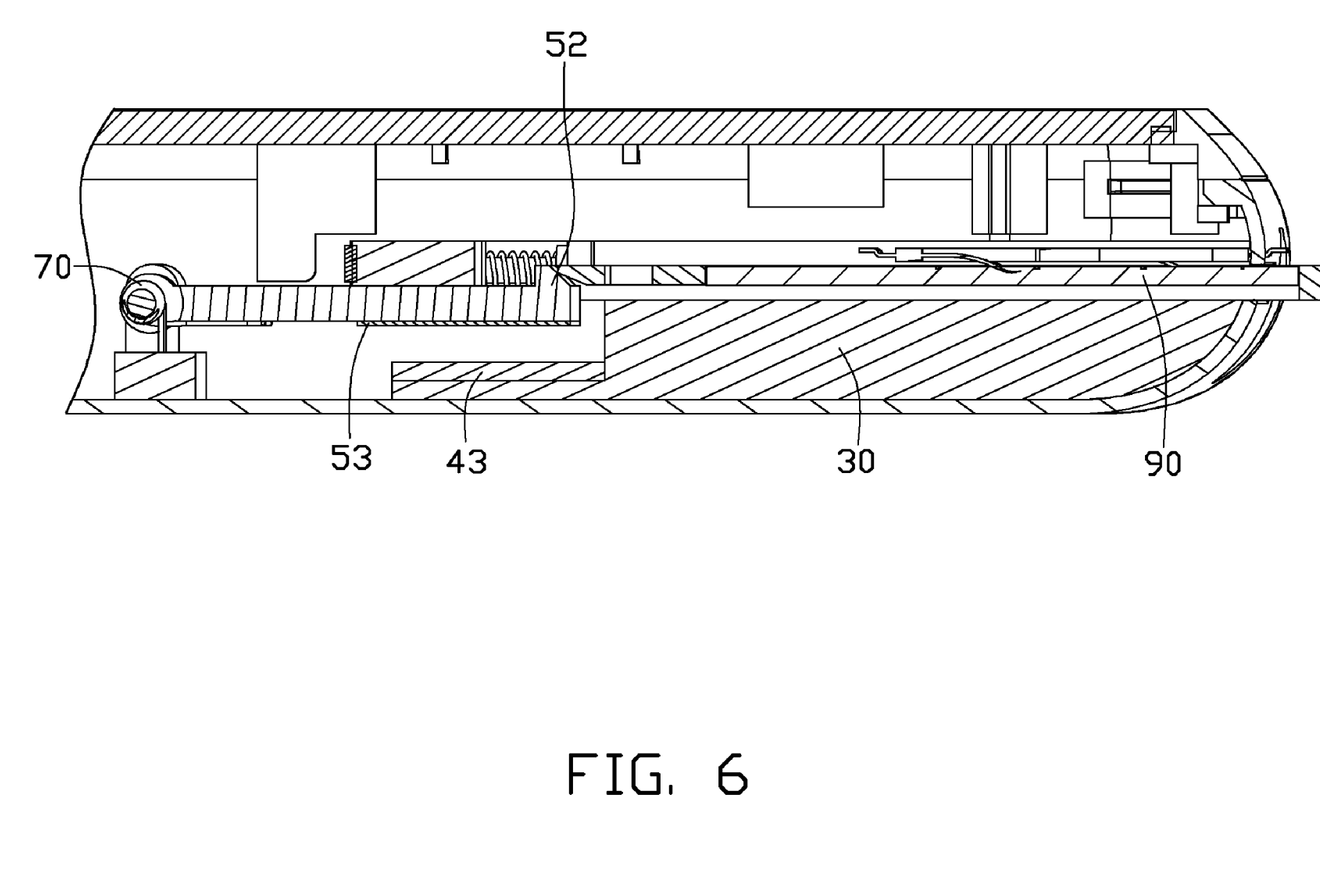
FIG. 6 is an portion sectional view of the groove member of FIG. 4 when the groove member is ejected.
Figure 7:
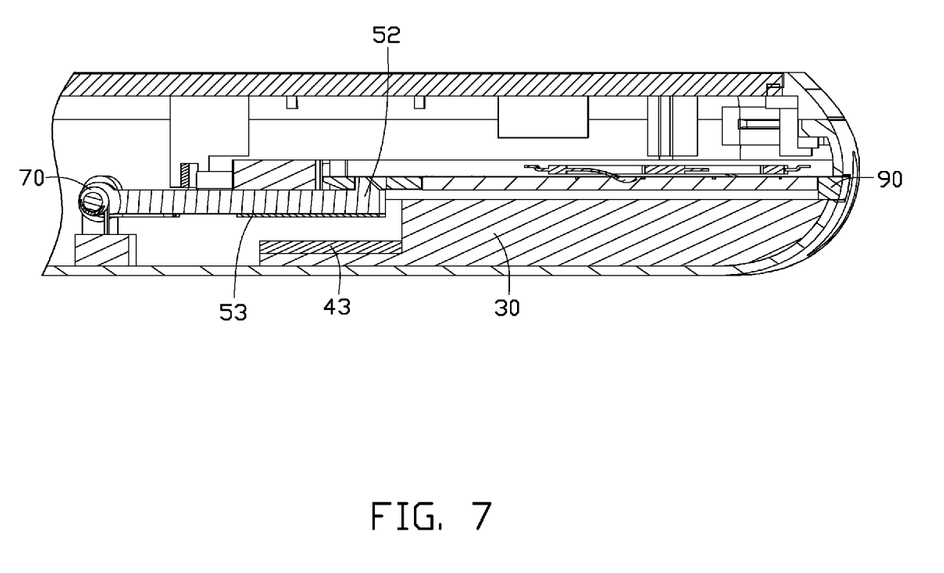
FIG. 7 is an portion sectional view of the groove member of FIG. 4 when the groove member is engaged with the mobile communications device.

Referring to FIGS. 6-7, When the electromagnet 43 is electrified, the electromagnet 43 generates a magnetic field to attract the hook portion 52, as a result, the hook portion 52 becomes disengaged from the hole 917 of the groove member 90. Furthermore, the spring pole 71 of the torsion spring 70 moves along with the hook device 50, and thus, the torsion spring 70 becomes compressed, and generates an elastic force on the hook device 50. Due to the elastic force from the first elastic device 60, the groove member 90 is pushed along a longitudinal side of the ejection device 40 until a portion of the groove member 90 is exposed to the hatch 322, thus, the SIM card can be inserted or removed from the exposed groove member 90.

When the electromagnet 43 is powered off, the magnetic field disappears, and the hook device 50 returns to the first position due to the elastic force of the torsion spring 70. After rejecting or inserting the SIM Card 100, the exposed portion of groove member 90 is pushed into the mobile communications device 1 until that the hook portion 52 of the hook device 50 engages with the hole 917 of the groove member 90 again. For better understanding the disclosure, the following is a detailed exemplary embodiment.

Figure 3:
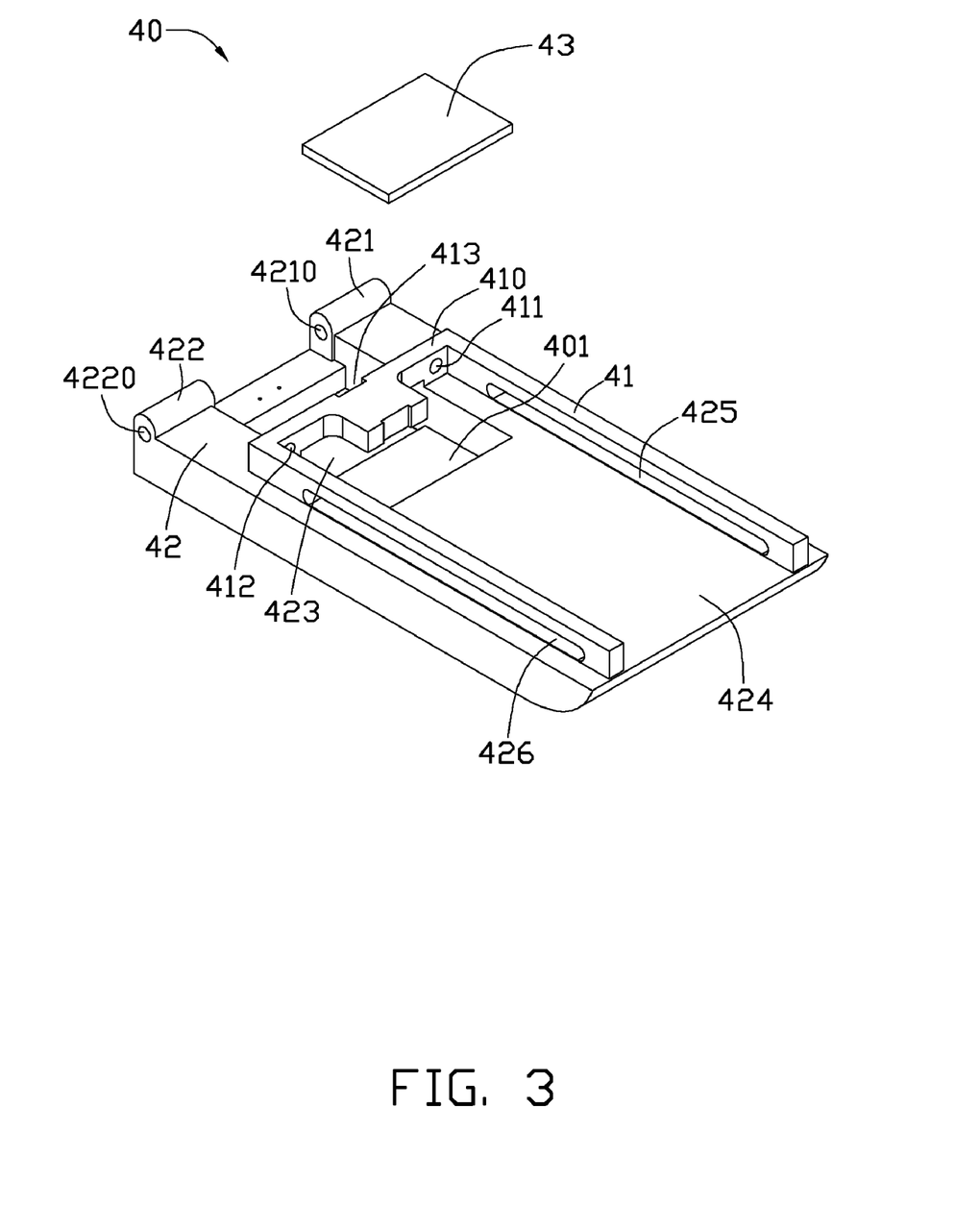
FIG. 3 is an enlarged view of an ejection device of the mobile communications device of FIG. 1.

The ejection device 40 is rectangular, and is fixed to the inner surface 31 of the back cover 30. The ejection device 40 includes an upper portion 41, a lower portion 42, and the electromagnet 43. The upper portion 41 and the lower portion 42 are rectangular, and the area of the upper portion 41 is less than that of the lower portion 42.

A second groove 424 is formed on the top surface of the upper portion 41. Sliding grooves 425, 426 are formed on each side of the second groove 424 correspondingly. The sliding grooves 425, 426 are configured for providing a slideway for the groove member 90. A second through hole 401 is formed on the top surface of the second groove 424. A resilient wall 410 is formed on one sidewall of the upper portion 41 adjacent to the second through hole 401. The resilient wall 410 defines holes 411, 412 in its two ends correspondingly. The holes 411, 412 extend along a longitudinal side of the upper portion 41. A hollow portion 413 is formed in a center of one sidewall of the upper portion 41, and is configured for receiving a switch device 80.

A first positioning pole 421 and a second positioning pole 422 protrudes from two ends of the one sidewall of the lower portion 42 correspondingly. In the exemplary embodiment, the first positioning pole 421 includes a hole 4210, and the second positioning pole 422 includes a hole 4220. The holes 4210, 4220 extend along a transverse side of the lower portion 42. A first groove 423 is formed on the top surface of the lower portion 42. In the exemplary embodiment, the width of the first groove 423 is substantially equal to the distance between the first positioning pole 421 and the second positioning pole 422. The electromagnet 43 is a rectangular, and is fixed on the top surface of the first groove 423.

Figure 4:
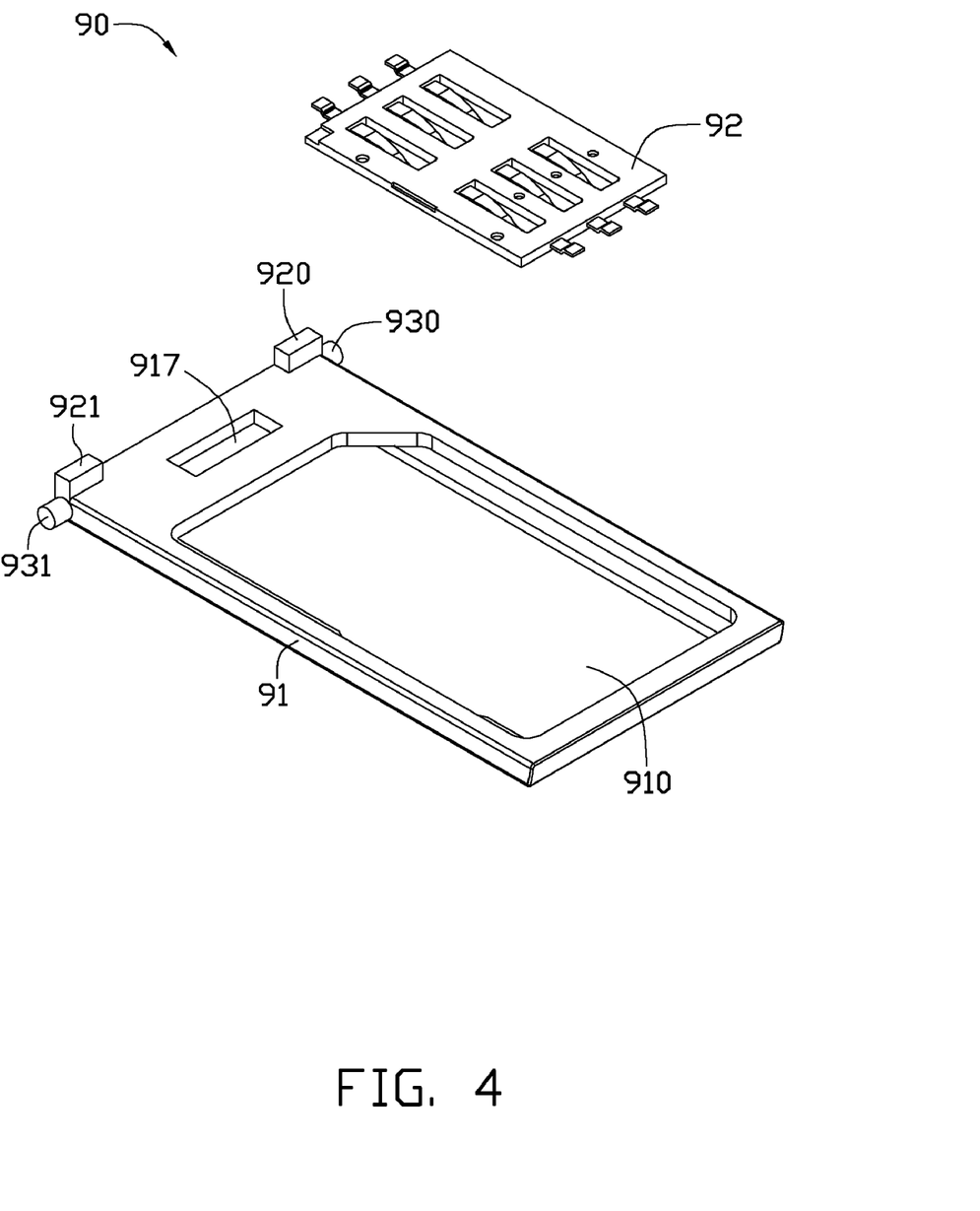
FIG. 4 is an enlarged view of a groove member of the mobile communications device of FIG. 1.

The groove member 90 is a rectangular, and includes a main body 91 and a connector 92. A third groove 910 is formed on the top surface of the main body 91, and is configured for receiving the SIM card 100. Protrusions 920, 921 protrudes from two ends of one sidewall of the main body 91 away from the third groove 910 respectively. Sliding bars 930, 931 along a transverse side of the main body 91 are extended from the two ends of the sidewall respectively. The sliding bars 930, 931 are positioned on the sliding grooves 425, 426 of the upper portion 41 correspondingly, as a result, the groove member 90 slides on the second groove 424. The hole 917 is formed on the top surface of the main body 91. When the groove member 90 is entirely received into the second groove 424, the hole 917 is aligned with the second through hole 401 of the upper portion 41. The connector 92 is electronically connected to the SIM card 100.

Figure 5:
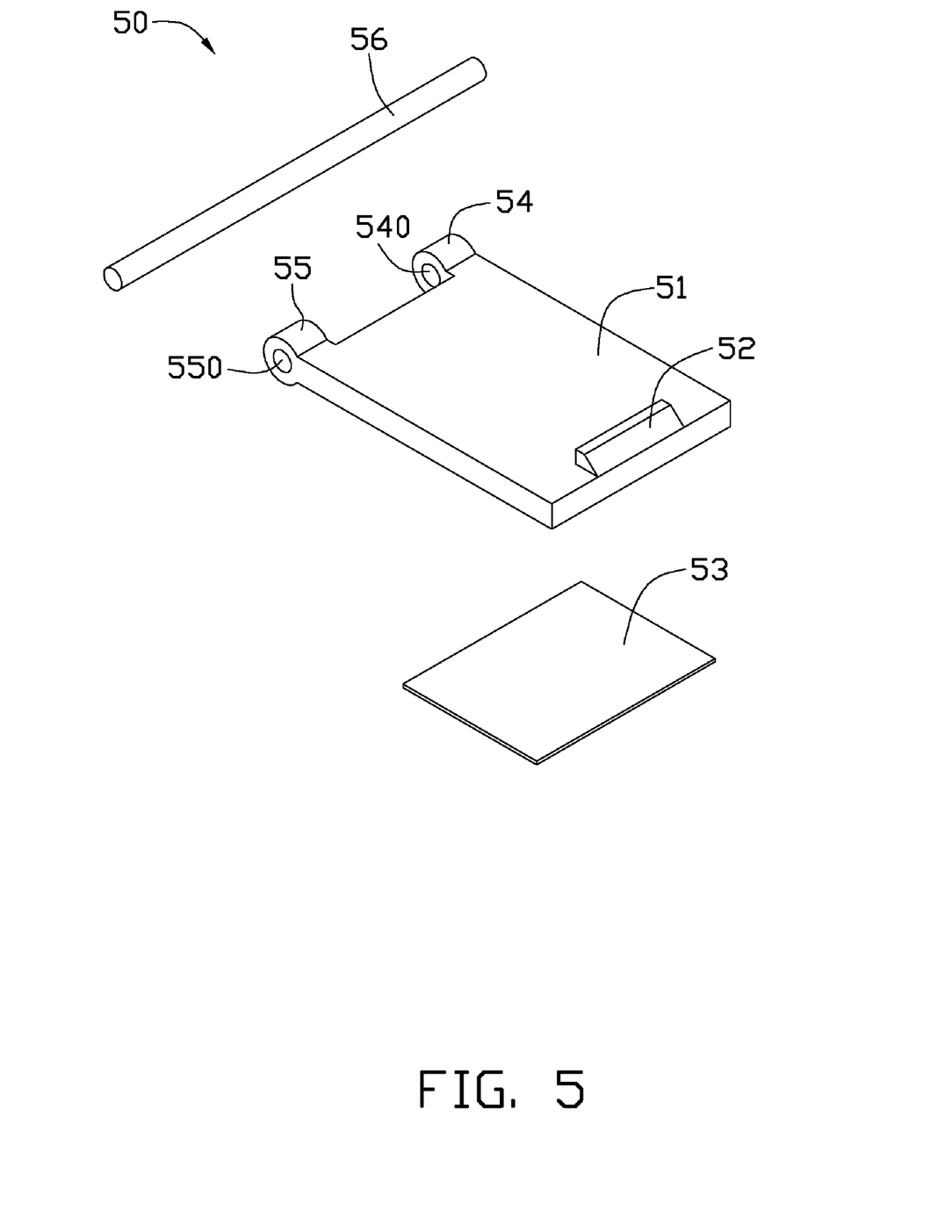
FIG. 5 is an enlarged view of a hook device of the mobile communications device of FIG. 1.

The hook device 50 is rotatably connected to the lower portion 42 of the ejection device 40. The hook device 50 includes a main body 51, a hook portion 52, protrusions 54, 55, and an axis 56. The hook portion 52 protrudes from the top surface of the main body 51. In the exemplary embodiment, the hook portion 52 is made of metal, and is attracted by the electromagnet 43 when the electromagnet 43 is electrified. In another embodiment, the hook device 50 further includes a sheet metal 53, which is fixed to the bottom surface of the hook portion 52, and is attracted by the electromagnet 43 when the electromagnet 43 is electrified. The protrusions 54, 55 are extended from two ends of one sidewall of the main body 51 away from the hook portion 52 respectively. Holes 540, 550 along a transverse side of the main body 51 are formed on the protrusions 54, 55 respectively. The axis 56 is passed through the holes 4210, 540, 550, and 4220, so as to make the hook device 50 to rotatably connect to the ejection device 40.

Figure 2:
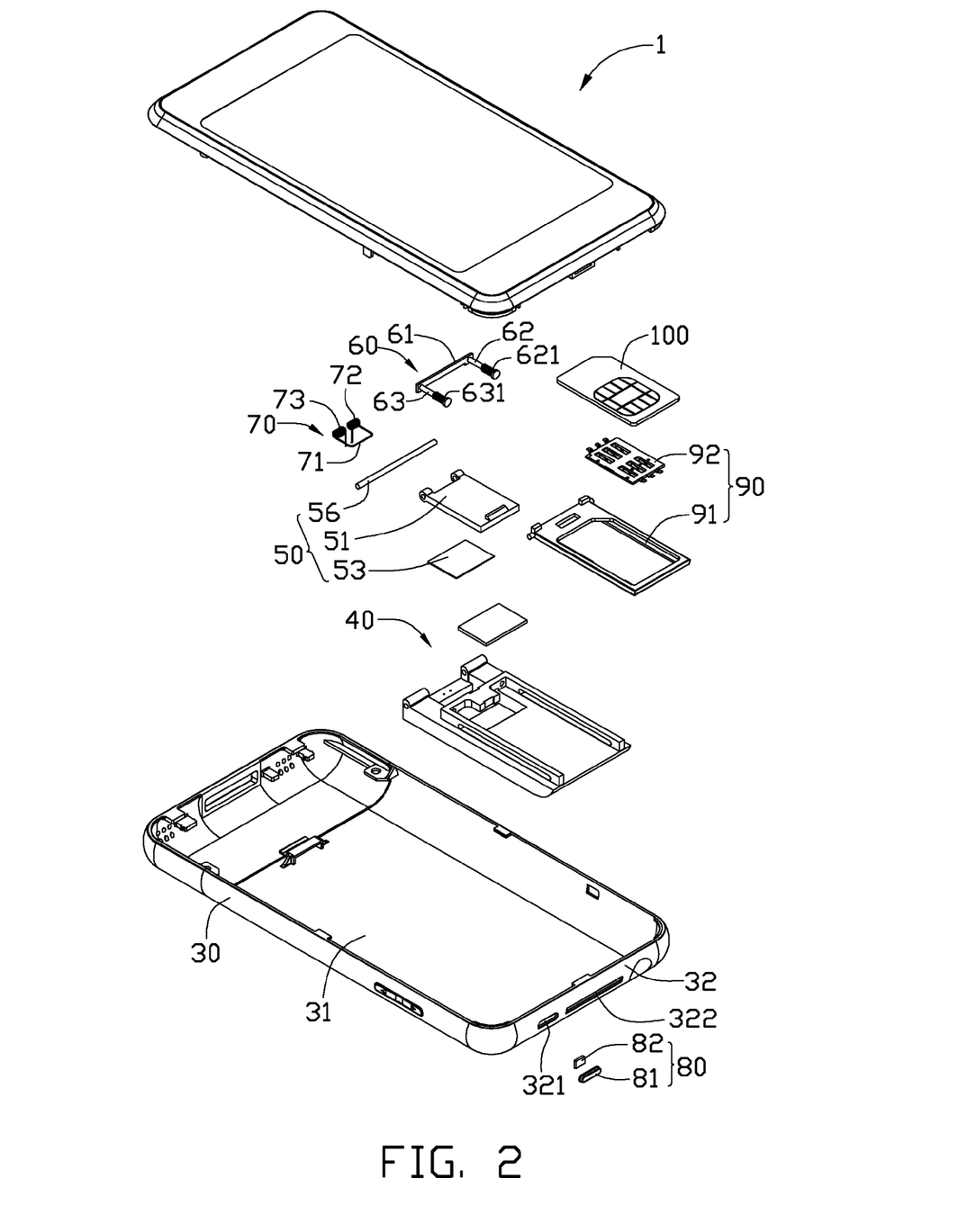
FIG. 2 is an exploded view of the mobile communications device of FIG. 1.

The first elasticity device 60 includes a baffle 61, a first axis 62, and a second axis 63. The first axis 62 and the second axis 63 are fixed to the same side of the baffle 61. Springs 621, 631 are coiled around the first axis 62 and the second axis 63 correspondingly.

The torsion spring 70 includes an elastic pole 71, and two spring portions 72, 73. The spring portions 72, 73 are formed on the end of the elastic pole 71, and are coiled around the axis 56 of the hook device 50.

The switch device 80 includes a first switch 81 and a second switch 82. The first switch 81 is received into the first through hole 321, and is configured for powering the electromagnet 43. The second switch 82 is positioned on the hollow portion 413 of the upper portion 41, and is configured for discontinuing power to the electromagnet 43. The first switch 81 and the second switch 82 are connected in series with the electromagnet 43. In the exemplary embodiment, the first switch 81 and the second switch 82 are automatic reset switches. When the first switch 81 and the second switch 82 are triggered, the first switch 81 and the second switch 82 will automatically reset after a predetermined time.

When assembling the mobile communications device 1, first, the first switch 81 is received into the first through hole 321, and the second switch 82 is mounted on the hollow portion 413 of the upper portion 41. The spring portions 72, 73 of the torsion spring 70 are coiled around the axis 56, and positioned between the protrusion 54 and the protrusion 55. The elastic pole 71 of the torsion spring 70 resists against the bottom surface of the main body 51, and the end of the spring portion 72, 73 are fixed to the lower portion 42. The axis 56 is passed through the holes 4210, 540, 550, 4220; as a result, the torsion spring 70 and the hook device 50 are rotatably connected to the lower portion 42. When the groove member 90 is pushed into the second groove 424 along the hatch 322, ends of the first axis 62 and the second axis 63 away from the baffle 61 are fixed to the protrusions 920, 921 of the groove member 90 correspondingly. The baffle 61 is taken away, another ends of the first axis 62 and the second axis 63 are passed through the holes 411, 412 correspondingly, and the baffle 61 is fixed to another end of the first axis 62 and the second axis 63 again, as a result, the first elasticity device 60 is fixed to the groove member 90. Simultaneously, users continues to compress the groove member 90, so as to compress the first elasticity device 60, as a result, the hook portion 52 is passed through the hole 917 and is engaged with one sidewall of the hole 917. The main body 20 and the front cover 10 cooperate with the back cover 30 to form the mobile communications device 1.

Referring to FIG. 6, when rejecting or inserting the SIM card 100, the first switch 81 is actuated to electrify the electromagnet 43 as a result the electromagnet 43 generates the magnetic field. The magnetic field attracts the hook portion 52 of the hook device 50 or the sheet metal 53 to adjacent to the electromagnet 43; as a result, the hook portion 52 is disengaged from the groove member 90. The spring pole 71 of the torsion spring 70 moves along with the hook device 50, accordingly, the torsion spring 70 is compressed to generate an elastic force relative to the hook device 50. Due to the elastic force of first elasticity device 60, the groove member 90 is pushed along a longitudinal side of the ejection device 40 until that a portion of the groove member 90 is exposed to the hatch 322, and thus, the user can directly reject or insert the SIM card out of or into the exposed groove member 90. During the movement of the groove member 90, the baffle 61 moves along with the groove member 90 until the second switch 82 is triggered. Due to the second switch 82 is triggered, the electromagnet 43 is powered off, and the magnetic field disappears, the hook device 50 resumes the initial position by the elastic force of the torsion spring 70.

Referring to FIG. 7, after rejecting or inserting the SIM card 100, the exposed portion of the groove member 90 is pushed into the second groove 424 until that the hook portion 52 is engaged with the hole 917 of the groove member 90 again.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A mobile communications device comprising:
   a back cover comprising an inner surface, a sidewall, and a hatch formed in the sidewall;
   an ejection device fixed to the inner surface of the back cover, the ejection device comprising an resilient wall protruding from the surface of the ejection device, and an electromagnet;
   a groove member slidably connected to the ejection device, and aligned with the hatch, and configured for putting in a subscriber identity module (SIM) card; the groove member defining a hole;
   a hook device rotatably connected to the ejection device, and positioned above the electromagnet, and the hook device comprising a hook portion, wherein, when the hook device keeps in a first position, the hook portion is engaged with the hole of the groove member;
   a first elastic device fixed to the groove member, and configured for pushing the groove member to move; and
   a torsion spring fixed to the ejection device, and configured for driving the hook device to return to first position;
   wherein, when the electromagnet is electrified to generate a magnetic field, the magnetic field attracts the hook portion to move towards the electromagnet, thereby, the hook device becomes disengaged from the groove member, and the groove member is pushed to expose via the hatch due to an elastic force of the first elastic device.

2. The mobile communications device as described in claim 1, wherein the ejection comprises an upper portion and a lower portion, the resilient wall protrudes from the top surface of the upper portion, a first groove is formed on the top surface of the lower portion, and the electromagnet is fixed in the first groove.

3. The mobile communications device as described in claim 2, further comprising a switch device, which comprises a first switch, wherein a first through hole is formed on the sidewall of the back cover; and the first switch is received into the first through hole, and is configured for electrifying the electromagnet.

4. The mobile communications device as described in claim 3, wherein a hollow portion is formed in one sidewall of the upper portion;
   the switch device further comprises a second switch, which is mounted on the hollow portion; and
   the first elastic device further comprises a baffle, during the time the groove member moves to the hatch, the baffle moves along with the groove member to trigger the second switch.

5. The mobile communications device as described in claim 4, wherein the first switch and the second switch are automatic reset switches, when being triggered, the first switch and the second switch automatically reset after a predetermined time.

6. The mobile communications device as described in claim 1, wherein the hook portion is made of metal.

7. The mobile communications device as described in claim 1, wherein the hook device further comprises a sheet metal, which is fixed to the bottom surface of the hook portion.

8. The mobile communications device as described in claim 2, wherein the hook device further comprises a main body and an axis, protrusions extend from two ends of one sidewall of the main body away from the hook portion correspondingly, holes are formed on the protrusions along a transverse side of the main body;
   a first positioning pole and a second positioning pole protrude from two ends of the one sidewall of the lower portion correspondingly; holes along a transverse side of the lower portion are formed on the first positioning pole and the second positioning pole correspondingly;
   the protrusions are positioned between the first positioning pole and the second positioning pole, the axis is passed through the above four holes, thereby, the hook device is rotatably connected to the lower portion of the ejection device.

9. The mobile communications device as described in claim 2, wherein a second groove is formed on the top surface of the upper portion, a sliding groove is formed on each side of the second groove correspondingly, and is configured for providing a slideway for the groove member;
   sliding bars along a transverse side of the main body are extended from the two ends of the sidewall correspondingly, and the sliding bars are positioned on the sliding grooves.

* * * * *